Nov. 17, 1942.                R. ATTI                2,301,922
                      MEANS FOR ROASTING COFFEE
                      Filed Oct. 5, 1939            2 Sheets-Sheet 1

INVENTOR
RAPHAEL ATTI
BY
ATTORNEY

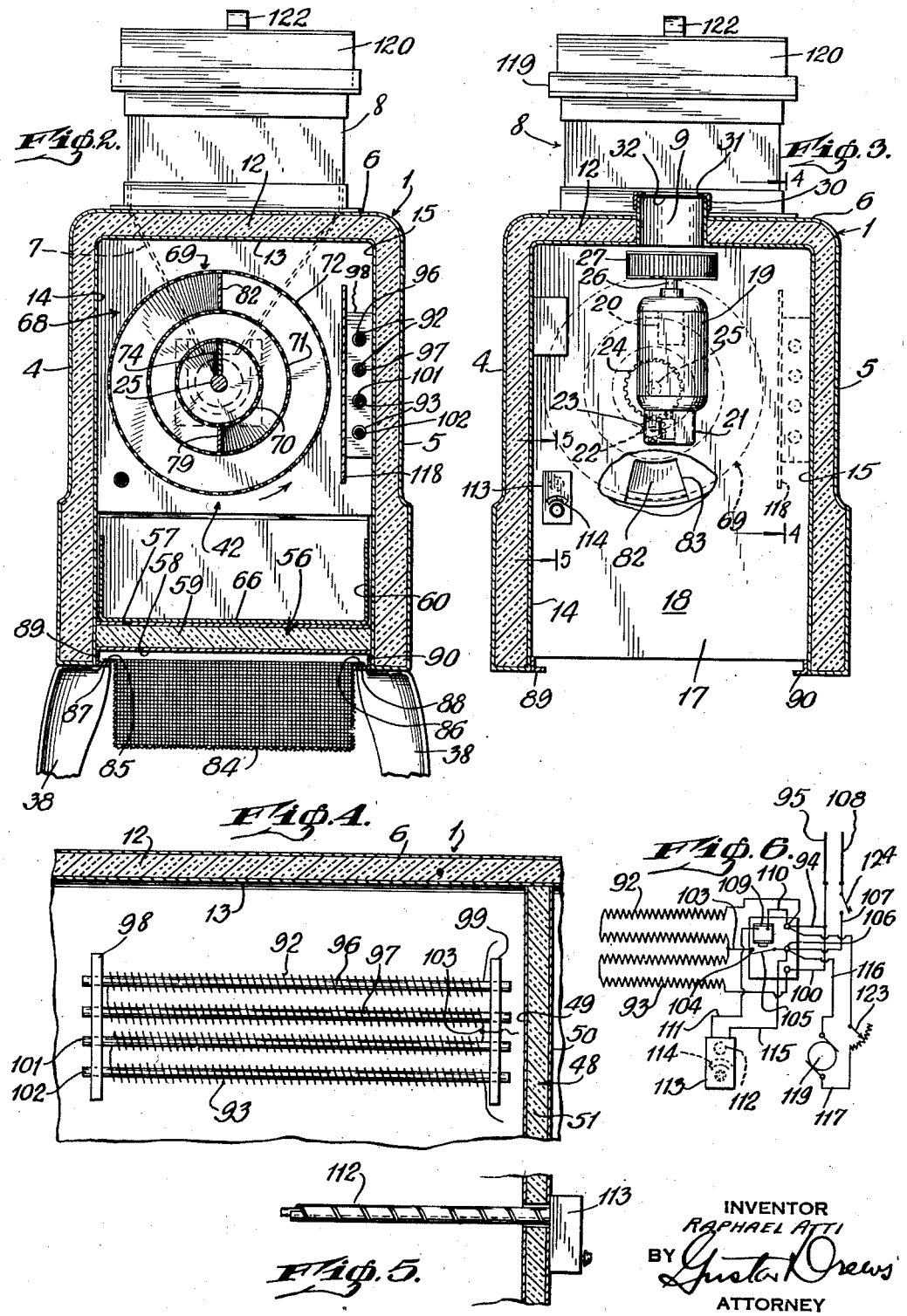

Patented Nov. 17, 1942

2,301,922

UNITED STATES PATENT OFFICE 2,301,922

MEANS FOR ROASTING COFFEE

Raphael Atti, Cliffside Park, N. J., assignor to William D. Breaker, Brooklyn, N. Y.

Application October 5, 1939, Serial No. 297,991

1 Claim. (Cl. 99—236)

This invention relates to an improved method of roasting coffee and to the machine for carrying out such method.

Among the objects of the present invention, it is aimed to provide an improved method for roasting coffee, and to provide an improved machine for carrying out such method which contemplates controlling the heat and circulation of the heat during the roasting period so that all of the coffee beans of a predetermined quantity will be uniformly roasted, and roasted to a predetermined extent.

It is still another object of the present invention to provide an improved method for roasting coffee and to provide an improved machine for carrying out such method, whereby a predetermined quantity of coffee may with facility be subjected to a roasting treatment for a predetermined period and at a predetermined temperature so that all of the coffee beans may be uniformly roasted, that is, subjected to the same roasting temperature and for the same period of roasting whereby not only the coffee portion advanced at the beginning of a predetermined supply, but also the coffee portions positioned in the intermediate stages of advance, and the coffee portions positioned at the end or final stage of advance of a predetermined supply, will all receive a uniform roasting treatment not only as to temperature but also as to time.

It is also an object of the present invention to provide an improved method for roasting coffee and to provide an improved machine to carry out such method, whereby no extraneous gases of combustion will be admitted to the coffee roasting chamber during its roasting period, and on the other hand the volatile matters including gases released by the coffee beans during the roasting process be confined against escape from the roasting chamber so that the coffee beans during the roasting period will actually be roasted in an atmosphere saturated with the gases or volatile matters released by the coffee beans, that is, with a view to retarding if possible the release of such gases from the coffee beans and thereby to enrich the aroma and in turn the flavor of the ultimate roasted coffee beans.

More specifically, it is an object of the present invention to provide an improved machine for roasting coffee in which in a comparatively small chamber a predetermined quantity of coffee beans may be passed a number of times with each bean individually exposed to the heat-transmitting gases of the chamber, and whereby at the same time the chaff, and particularly the fuzzy outer particles of the green bean introduced, are effectively removed during the roasting process.

Specifically, it is still another object of the present invention to provide a machine for roasting coffee having a plurality of concentric passages provided with spirals for directing the coffee through the several concentric passages from one to the other, whereby the individual beans of a predetermined quantity may be effectively separated, exposed to the heat-transmitting gases, and in turn a predetermined limited area used to the best advantage for an extensive composite passage of the coffee composed of the several concentric passages.

Specifically, it is still another object of the present invention to provide an improved machine for roasting coffee, having a plurality of concentric foraminous drums mounted upon a rotatable shaft and having spirals for advancing a predetermined quantity of coffee through these several drums while roasting the same so that some of the chaff of the coffee bean may be removed while the coffee bean is being tumbled in contact with the foraminous walls of the drums, and additional pneumatic means provided for supplementing the removal of the chaff from the bean as the bean is finally discharged from the roasting chamber.

These and other features, capabilities and advantages of the improved method for roasting coffee and of the machine for carrying out such method will appear from the subjoined detail description of one embodiment of the invention illustrated in the accompanying drawings in which Fig. 1 is a longitudinal section of the coffee roasting machine;

Fig. 2 is a section on the line 2—2 of Fig. 1;

Fig. 3 is a section on the line 3—3 of Fig. 1;

Fig. 4 is a section on the line 4—4 of Fig. 3;

Fig. 5 is a section on the line 5—5 of Fig. 3; and

Fig. 6 is a diagram of the wiring for the heating unit, motor and thermostat associated with the improved coffee roasting machine.

Figure 1:
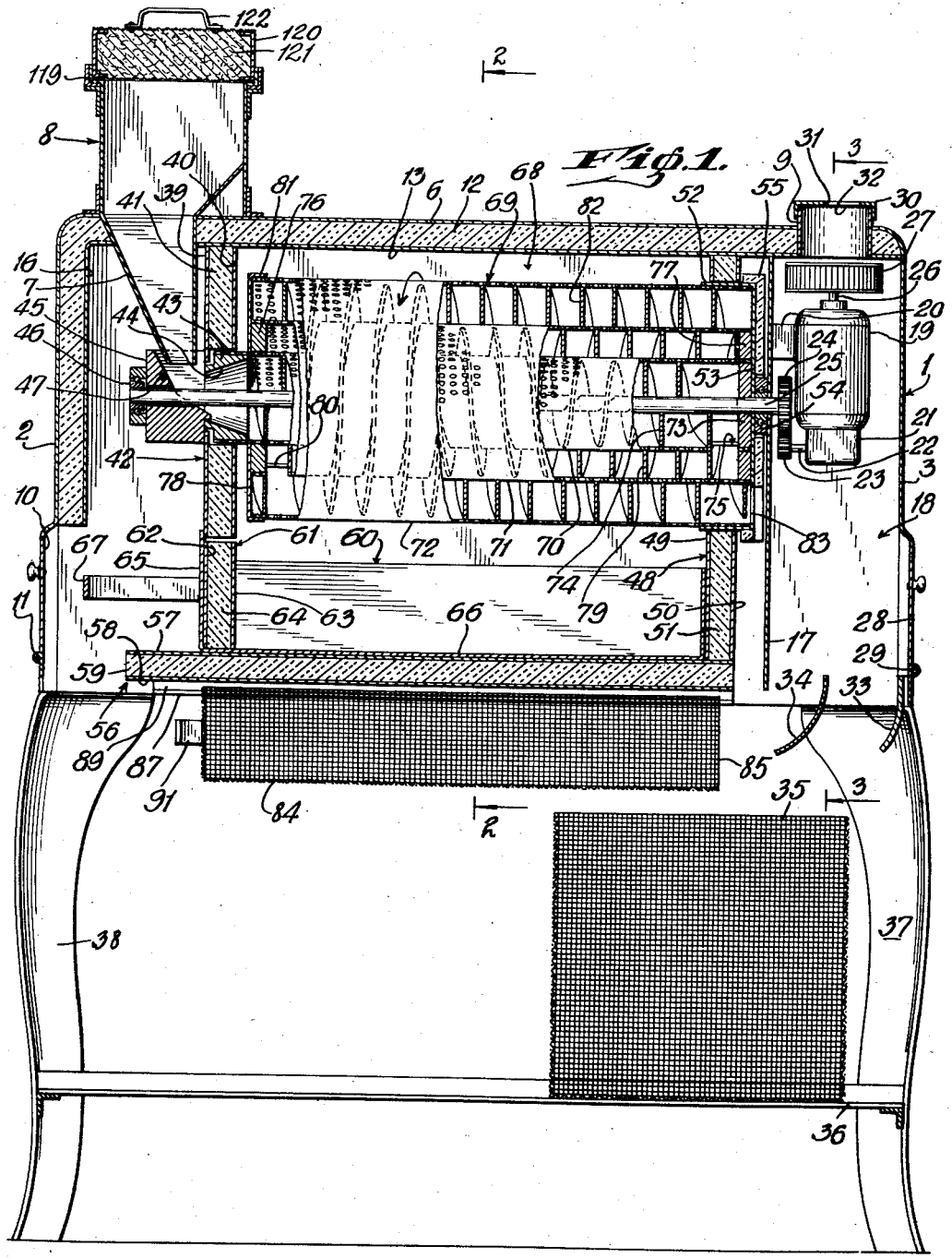

In the embodiment illustrated, there is provided a main housing 1, having a front wall 2 and rear wall 3, two side walls 4 and 5, and an upper wall 6. These several wall elements 2, 3, 4, 5 and 6, may be composed of metal and connected to one another in the usual way. The upper wall 6 is preferably provided with an elongated opening near the wall 2 to receive the funnel-shaped extension 7 of the hopper 8. The wall 6 also preferably has a round opening at its rear end to receive the cylindrical extension 9 disposed adjacent the rear wall 3. Preferably, the wall 2 is provided with a door opening to receive the door 10, hingedly connected at its lower end 11.

For the purposes hereinafter to be described, certain portions of the walls above referred to are provided with an inner lining of insulation. As an instance, the upper wall 6 is provided with an insulation layer 12 secured to the inner face thereof and extending down along the inner faces of the walls 4 and 5 but not extending down the inner face of the rear wall 3, and only extending down along the front wall 2 to a point just immediately above the door opening for the door 10. This insulation may be composed of magnesium rock, rock wool, asbestos, or the like. For securing this insulation 12 in position preferably the inner face of the insulation 12 is provided with a metal sheet such as the sheet 13 below the wall 6, the sheets 14 and 15 inside of the walls 4 and 5 respectively, and the sheet 16 inside of the wall 2. Extending down from the sheet 13 substantially parallel to the main portion of the rear wall 3, but spaced therefrom to form a chamber, there is provided the metal partition 17. This partition extends the full width of the housing 1 and is disposed forwardly of the opening for the cylinder 9 to provide an air passage from the opening through the cylinder 9 down through the housing between the wall 3 and partition 17.

The chamber 18 formed between the partition 17 and wall 3 also contains the motor 19 secured by the bracket 20 to the rear face of the partition 17, and having a transmission gearing in the extension 21 provided with the shaft 22 on which is mounted the pinion 23 in mesh with the pinion 24 on the main driven shaft 25 of the coffee roasting chamber. The shaft 26 of the motor 19 at its upper end has secured thereto the fan 27, preferably of the "sirocco" type, which is disposed immediately below the opening for the cylinder 9 to draw air inward through the cylinder 9 into the chamber 18 in a downward direction. The lower end of the wall 3 is preferably provided with a door opening for the door 28 hingedly connected at 29 at its lower end to afford access as an instance to the lower end of the motor and power transmitting gears. Preferably, the collar 9 is provided with a cap 30 having an opening 31 provided with a suitable foraminous sheet 32, to permit the passage of air but prevent the wrongful admission of objectionable paper, destructive elements and the like.

The lower end of the chamber 18 is provided with two deflecting baffles 33 and 34, the baffle 33 being provided to deflect the air passing down through the chamber 18 into the basket 35 for receiving the finally roasted coffee beans. The basket 35 as shown is preferably composed of foraminous material, and rests on inwardly extending webs of the angle-irons 36 secured to the legs 37 at the rear end extending down from the rear corners of the housing 1, and the legs 38 extending down from the front corners of the housing 1.

To form a heat conserving roasting chamber or compartment, there is secured to the inner sheets 13, 14 and 15, the insulating partition consisting of the outer metal layers 39, 40 and intermediate insulation 41. This partition 42 extends down just rearwardly of the funnel 7 of the hopper 8 and down to a level, in the present instance, slightly below the level of the lower end of the inner sheet 16. This partition 42 has a central opening to clear the collar 43, having a conical opening 44 flaring outward axially in a rearward direction relative to the front wall 2. Forwardly of the sheet 39 of the partition 42 there is provided the bracket in the present instance consisting of a block 45 through which the front end of the shaft 25 is journalled extending into the roller bearing housing 46 secured to the forward end of the bracket 45. This bracket 45 has a downwardly inclined face 47 to receive the coffee beans as they are fed thereto by the funnel 7, and then pass it on to the flaring wall 44 of the collar 43 in turn to pass it on to the inner and first of a series of concentric chambers.

Just forwardly of the partition 17, the rear wall 48 of the roasting chamber is provided, it including the outer metal walls 49 and 50 enclosing the inner insulation portion 51. This wall 48 extends closely adjacent to the partition 17 and extends inwardly from the inner sheets 13, 14 and 15. It is provided with a large circular opening concentric to the opening in the front partition 42 to clear the cylindrical portion 52 of the disc 53 mounted on the shaft 25. Secured to the partition 17 and adjacent to the disc 53 is the roller bearing 54 for receiving the shaft 25. In order to heat insulate the rear face of the disc 53 from the partition 17, an annular section 55 of insulation is secured to the rear face of the disc 53 and just clears the roller bearing housing 54. The lower end of the partition 48 extends down below the partition 42 and is connected at its lower end to a floor member 56 consisting of the outer sheetings 57 and 58, and the inner insulation 59. This partition 56 (see Fig. 2) extends from the inner sheeting 14 to the inner sheeting 15 of the side walls 4 and 5 respectively, and in its forward extent extends beyond the partition 42 and is shown in the present instance as extending about midway between the sheeting 39 and sheeting 16. The partition 56 at its forward portion below the partition 42 is spaced therefrom, as particularly shown in Fig. 1, to form an entrance for a drawer 60 consisting of a metal box open at the top and having an insulated front wall 61 consisting of the sheetings 62, 63 and the insulation 64 therebetween. The front metal sheet 65 in front of the sheeting 62 in the present instance extends down below the partition 61 and continues on into the lower metal floor 66 of the drawer 60. The lower face of the drawer 60 is comparatively smooth in order readily to slide on the upper face of the sheeting 57 of the floor member 56 of the roasting chamber. In order to facilitate removing the drawer 60 when desired, there is formed a handle 67 at its front end which may be grasped when the door 10 is opened to withdraw the drawer from its place at the bottom of the roasting furnace through the door opening of the door 10.

In the roasting chamber 68 formed by the upper wall 6 and its sheeting 13 and insulation 12, the side walls 4 and 5 with their insulation and inner sheetings, the front and rear partitions 42 and 48 respectively, and the floor partition 56, there is provided a drum 69 fixed to rotate with the shaft 25. The drum (see Fig. 2) consists of three cylindrical concentric foraminous layers 70, 71 and 72. The cylindrical layer 70 is fixed at one end to the collar 43 and at the other end to the collar 73 fixed on the shaft 25. The foraminous layer 70 is spaced from the shaft 25 and secured thereto by the metal spiral sheet 74 which preferably has thirteen spirals in its extent from the collar 43 to the collar 73 and inclined when rotated in a counter-clockwise direction when looking from the rear, to advance the coffee beans in a rearward direction. It is herein to be noted that the chamber formed by the cylindrical layer 70 is concentric to the conical opening in the collar 43 to receive the coffee as it is fed through the hopper 8, funnel 7, and mouth formed by the block 45 and collar 43.

At the rear end of the cylindrical layer 70 immediately in front of the collar 73, there is formed a small opening 75 just beyond the rearmost spiral of the spiral sheet 74. The ends of the cylindrical sheet 71 are mounted upon collars, the front end upon the collar 76 and the rear end upon the collar 77. The collar 76 in turn is mounted upon the cylindrical sheet 70 adjacent to the collar 43 and in turn to the rear face of the annular disc 78 mounted upon the cylindrical sheet 70 adjacent to the collar 43. The collar 77 in turn is mounted upon the rear end of the cylindrical sheet 70 more or less in alignment with the collar 73 and secured to the front face of the disc 53. This cylindrical foraminous sheet 71 is definitely spaced from the foraminous sheet 70 by the spiral sheet 79, likewise having thirteen spirals extending from the collar 77 at the rear to the collar 76 at the front, and inclined so that when the drum 69 is rotated in a counter-clockwise direction when looking from the rear, the coffee beans received through the opening 75 from the chamber within the cylinder 70, will be fed forwardly. Adjacent the forward end of the cylindrical sheet 71 and adjacent to the rear of the collar 76, there is formed a small opening 80 to permit the discharge of the coffee beans from the cylinder 71 at its forward end, after having so been advanced to the front end of the cylinder 71. Radially outward of the cylinder 71, the cylindrical foraminous sheet 72 is secured at its front end to the annular flange 81 of the disc 78 and at its rear end to the inner face of the flange or cylindrical portion 52. In addition, the cylindrical sheet 72 is spaced from the cylindrical sheet 71 by the spiral sheet 82 extending throughout the length of the cylindrical sheet 72 from front to rear and consisting of thirteen spirals inclined so that when the drum 69 is rotated in a counter-clockwise direction looking from the rear, the coffee beans received through the opening 80 from the cylinder 71 are fed in a rearward direction.

At the rear end of the cylindrical sheet 72 in the disc 53, there is formed a small opening 83 through which the coffee beans are finally discharged after the roasting treatment has been completed. The beans so discharged then pass adjacent the front face of the partition 17 down into the basket 35. While so passing down into the basket 35, the portion of the stream of cool air passing down the chamber 18 which strikes the baffle or deflector 34, is directed laterally with sufficient force to free the final chaff or objectionable particles from the coffee beans, and direct them into the basket 84 through its open end 85 at the rear. The coffee beans, after being so subjected to this draft of cool air, pass down into the basket 35. The basket 84 (see Fig. 2) is provided with laterally extending flanges 85 and 86 to rest on the inwardly extending webs 87 and 88 respectively of the angle-irons 89 and 90 extending along the inner lower ends of the walls 4 and 5. The front end of the basket 84 is provided with a handle 91 to facilitate the removal of the basket forwardly along the angle-irons 89 and 90.

From the foregoing it will appear that the coffee beans as they advance rearwardly along the cylinder 70, forwardly along the cylinder 71, and again rearwardly along the cylinder 72, will be guided in such movement due to the inclination of the several spiral sheets 74, 79 and 82, remain along the lower ends of said cylinders, throughout their movement, tumble along due to the foraminous nature of the sheets 70, 71, and 72, thereby to free themselves of the chaff or outer objectionable fuzzy matter which will drop from one cylinder to the other until it finally drops into the drawer 60, from there to be removed. It will also appear that whatever flaky, fuzzy particles may still adhere to the bean after leaving the opening 83, will be substantially removed by the air stream directed by the deflector 34 which fuzzy particles will then be received by the basket 84 and from there be removed, and that the finally roasted bean will then be received in the basket 35 there to be finally cooled by the air blast coming down the chamber 18, the foraminous nature of the wall structure of the basket 35 facilitating the ready passage of the cooled air through the basket 35, and the ready removal of the air so heated by coming in contact with the heated beans in the basket 35.

The heating arrangement will now be described. The chamber 68 is preferably heated by a heat transmitter which will not distribute or circulate any products of the heating medium in the roasting chamber 68. In the present instance, an electrical heating unit is provided, consisting of the heating wires 92 and 93. The heating wire 92 (see the diagram illustrated in Fig. 6) is connected by the conductor 94 to the main lead 95 and (see Fig. 4) is preferably wound upon the two parallel rods 96 and 97 mounted in the supporting plates 98 and 99 secured to the sheeting 15 to one side of the drum 69. The other heating wire 93 is connected by the conductor 100 to the main lead 95 and wound upon the rods 101 and 102 (see Fig. 4), which are mounted in the aforesaid supporting plates 98 and 99. The ends of the heating wires 92 and 93 which are not connected to the main lead 95 are, as an instance as shown, connected to the common conductor 103 which in turn is connected to the contact 104 to be engaged by the switch arm 105 which is connected to the contact 106 which is connected by the conductor 107 to the other main lead 108. The switch arm 105 normally engages the contact 104 when the switch 124 is closed and the electro-magnet 109 is energized, one end of the winding of the electro-magnet 109 being connected by the conductor 110 to the conductor 94, and the other end of the winding of which being connected by the conductor 111 to the bimetallic thermostat 112 mounted in the housing 113, provided with the control dial 114. The other terminal of the bimetallic thermostat 112 is connected to the conductor 115. In other words, depending upon the speed of the motor 19 and the consequent feed through the roasting chamber of a predetermined unit of coffee, the temperature can be regulated by the regulating dial 114. If the heat in the roasting chamber 68 exceeds this predetermined temperature then in the regular way the thermostat 112 will interrupt the current to the electro-magnet 109 to de-energize the electro-magnet 109 to release the arm 105 to interrupt the electric circuit to the heating wires 92 and 93 and permit the temperature to drop, and in turn when the temperature has dropped sufficiently, the thermostat 112 will again close the circuit of the electro-magnet 109 to actuate the arm 105 to engage the contact 104 to reestablish the electric current for the heating wires 92 and 93.

The wiring diagram in Fig. 6 also shows the motor 19 connected to the main leads 95 and 108, one terminal of the motor 19 being connected by the conductor 115 to the contact 106 which is connected by the conductor 107 to the main lead 108, and the other terminal of the motor 19 being connected by the conductor 117 to the conductor 94 which is connected to the other main lead 95.

In order to prevent the beans in the drum 69 being subjected to radiant heat and thereby effect a fairly uniform heat throughout the roasting chamber, there is provided a sheet metal plate 118 secured to the inner ends of the supporting plates 98 and 99 sufficiently removed from the heating units 92 and 93 so that this plate 118 cannot become incandescent and transmit radiant heat to the beans being roasted.

The hopper 8 is preferably provided with a flanged cover-supporting collar 119 to receive the cover 120 preferably having a thickness 121 of steel wool to shut off the escape of the volatile gases resulting during the roasting of the coffee. This cover 120 is provided with a handle 122 to remove the same when desired.

From the foregoing, it will thus appear that the coffee being roasted is subjected to a heat transmitted by the gases or air contained in the chamber 68 which in turn are heated either by contact with the heating wires 92 and 93 or radiant heat from such heating wires 92 and 93. It also will appear that the coffee will not in any way be subjected to any radiant heat. One reason for protecting the coffee beans from radiant heat is that it is practically impossible to uniformly heat the entire surface of a coffee bean due to its conformation by radiant heat. This would be so whether the drum 68 were surrounded by a radiant heat transmitting element or not, since it is of course obvious that only one face of a coffee bean can be exposed to the radiant heat even in such case. From a practical standpoint, however, the heating unit disposed at one side of the chamber 68, as here illustrated, and enclosed so that all radiant heat will be shut off from the bean, will facilitate the uniform roasting of the entire surface of each individual coffee bean without the danger of burning any portion thereof. It will also appear that with the heating unit such as the present, no foreign products of combustion such as will be created in the burning of gas or the like, can possibly surround the coffee bean being roasted and thereby contaminate the same. It is of course well known that the coffee bean when roasted is a spongy, absorbent substance, and will readily absorb such products of combustion so that the average coffee-taster can readily detect such contamination. Here, the coffee bean is subjected to a heated atmosphere consisting mainly of air saturated with the volatile fumes or gases which may be released by the coffee during roasting. Consequently, in the final stage of the roasting process, when the bean would be most likely to absorb foreign substances, it can only absorb particles suspended in the volatile gases and fumes released by itself thereby, if anything, to replenish it with any of its coffee ingredients which it may have lost during the roasting process.

From Fig. 1 it will clearly appear that the only outlet for any of the heated gases contained in the roasting chamber, will be through the small opening 83 in the disc 53, which opening will be substantially shut off at least a part of the time when the coffee beans are being discharged therefrom in the position illustrated in Fig. 1. The opening forwardly through the collar 43, block 45, to the funnel 7, hopper 8, will be blocked off when there is still some coffee in the hopper 8, funnel 7, or block 45, being fed to the drum 69, and only near the end of the roasting treatment may such gases pass up into the hopper 8 and then they will be blocked by the cover 120.

The dimensions of the drum and roasting furnace may obviously be enlarged or diminished without materially affecting the result herein desired to be produced. It is considered desirable, however, to mention that excellent results have been achieved when the length of the drum is substantially seventeen inches, the diameter of the inner cylindrical sheet 70 about three inches, the diameter of the intermediate cylindrical sheet 71 about five and one-quarter inches, and the diameter of the cylindrical sheet 72 about eight inches. With the drum having the dimensions as aforesaid and the consequent extended passage provided by the spirals 74, 79 and 82, and with a temperature of about four hundred degrees, and a speed of rotation for the drum of about 4 R. P. M., it has been found that it requires about eight minutes to feed a predetermined unit of coffee from the collar 43 into the basket 35, and properly roast it. The openings from one cylinder to the other, as an instance the openings 75 and 80, are preferably about one and three-eighths inches by two inches. Preferably, the mesh of the several foraminous sheets should not exceed a mesh having openings of one-eighth inch in diameter.

The motor 19 is preferably provided with a rheostat 123 to control the speed of the motor 19 regulated relative to the temperature determined.

It is obvious that various changes and modifications may be made to the details of construction of the improved machine for roasting coffee and in the steps of the improved method for roasting coffee, hereinabove described, without departing from the general spirit of the invention as set forth in the appended claim.

I claim:

The combination with an enclosed roasting furnace, a drum extending through said furnace for receiving the coffee beans being roasted, means for heating said furnace, means for rotating said drum, a spiral in said drum for advancing the beans through said drum and thereby through said furnace while being roasted, a hopper having a funnel for supplying the coffee beans to said drum, a discharge outlet for the drum extending out of the furnace, a basket registering with said outlet to receive the beans as they are discharged, means forming an air passage disposed adjacent to said furnace with an opening at the top thereof, a motor drivingly connected to said rotating means mounted in said passage, a fan connected to said motor and positioned to direct a blast of air downwardly, deflectors at the lower end of said passage, one of said deflectors receiving and deflecting part of the blast of air laterally upon the beans as they drop from said outlet into said basket to remove any fuzzy particles that might still cling to the beans, and the other deflector directing a blast of air onto the coffee beans in the basket to cool the same.

RAPHAEL ATTI.